US012272221B2

(12) United States Patent
Soto et al.

(10) Patent No.: US 12,272,221 B2
(45) **Date of Patent: *Apr. 8, 2025**

(54) RADIO FREQUENCY IDENTIFICATION (RFID) TAG LOCATION VERIFICATION USING ACOUSTO-MAGNETIC DETECTION

(71) Applicant: Sensormatic Electronics, LLC, Boca Raton, FL (US)

(72) Inventors: Manuel A. Soto, Lake Worth, FL (US); John Clark, Boynton Beach, FL (US); John A. Allen, Pompano Beach, FL (US); Adam S. Bergman, Boca Raton, FL (US)

(73) Assignee: Sensormatic Electronics, LLC, Boca Raton, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/723,254

(22) Filed: Apr. 18, 2022

(65) Prior Publication Data

US 2022/0254236 A1 Aug. 11, 2022

Related U.S. Application Data

(63) Continuation of application No. 17/005,089, filed on Aug. 27, 2020, now Pat. No. 11,308,780.

(Continued)

(51) Int. Cl.
*G08B 13/24* (2006.01)

(52) U.S. Cl.
CPC ..... *G08B 13/2422* (2013.01); *G08B 13/2417* (2013.01)

(58) Field of Classification Search
CPC ............ G08B 13/2422; G08B 13/2442; G08B 13/2448; G08B 13/2451; G08B 13/248; G06K 19/07749
See application file for complete search history.

(56) References Cited

U.S. PATENT DOCUMENTS

| | | | | |
|---|---|---|---|---|
| 2004/0201478 A1* | 10/2004 | Reid | G06K 19/07758 | 340/572.1 |
| 2008/0088417 A1* | 4/2008 | Smith | G06K 19/0712 | 340/572.1 |

(Continued)

FOREIGN PATENT DOCUMENTS

| | | |
|---|---|---|
| CN | 206773725 U | 12/2017 |
| CN | 207380860 U | 5/2018 |

(Continued)

*Primary Examiner* — Mirza F Alam
(74) *Attorney, Agent, or Firm* — ArentFox Schiff LLP

(57) ABSTRACT

Example implementations include a method, apparatus, and computer-readable medium for electronic article surveillance (EAS), comprising transmitting an acousto-magnetic (AM) interrogation signal into an AM interrogation zone of an EAS system. The AM interrogation zone and a wireless communication zone overlapping to form a zone of interest. The wireless communication zone employing a wireless communication technology other than AM. Indicating, by the EAS system, a presence of a first tag of the EAS system in the zone of interest upon a concurrent detection of both i) a response signal of the first tag via the wireless communication technology and ii) an AM response signal of the first tag in response to the AM interrogation signal.

20 Claims, 7 Drawing Sheets

Related U.S. Application Data

(60) Provisional application No. 62/897,958, filed on Sep. 9, 2019, provisional application No. 62/894,686, filed on Aug. 30, 2019.

(56) References Cited

U.S. PATENT DOCUMENTS

| | | | | |
|---|---|---|---|---|
| 2009/0201155 | A1* | 8/2009 | Arguin | G08B 13/242 340/572.1 |
| 2015/0194030 | A1* | 7/2015 | Davidson | G08B 13/2468 340/572.7 |
| 2016/0098907 | A1* | 4/2016 | Noone | G01V 8/10 340/551 |
| 2021/0027608 | A1* | 1/2021 | Shakedd | G08B 21/24 |

FOREIGN PATENT DOCUMENTS

| | | | |
|---|---|---|---|
| CN | 108985395 | A | 12/2018 |
| WO | 2011037604 | A1 | 3/2011 |
| WO | 2012023958 | A1 | 2/2012 |

* cited by examiner

RADIO FREQUENCY IDENTIFICATION (RFID) TAG LOCATION VERIFICATION USING ACOUSTO-MAGNETIC DETECTION

CROSS-REFERENCE TO RELATED APPLICATIONS

This application is a Continuation of, and claims priority to, pending U.S. Non-Provisional patent application Ser. No. 17/005,089, entitled "RADIO FREQUENCY IDENTIFICATION (RFID) TAG LOCATION VERIFICATION USING ACOUSTO-MAGNETIC DETECTION," field Aug. 27, 2020, which claims the benefit of i) U.S. Provisional Application No. 62/894,686, entitled "RFID TAG DETECTING ACOUSTIC MAGNETIC TAG INTERROGATION SIGNALS," filed Aug. 30, 2019, and ii) U.S. Provisional Application No. 62/897,958, entitled "METHOD FOR USING ACOUSTO MAGNETIC DETECTION FIELDS TO DETERMINE RFID SECURITY TAG POSITION," filed Sep. 9, 2019—each of which is expressly incorporated by reference herein in its entirety.

BACKGROUND

Technical Field

The present disclosure relates generally to Electronic Article Surveillance (EAS). Examples related to EAS using a Radio Frequency Identification (RFID) tag with tag location verifies by acousto-magnetic (AM) detection.

INTRODUCTION

EAS systems are commonly used in retail stores and other settings to prevent the unauthorized removal of goods from a protected area. Typically, a detection system is configured at an exit from the protected area, which comprises one or more transmitters and antennas ("pedestals") capable of generating an electromagnetic field across the exit, known as the "interrogation zone." Articles to be protected are tagged with an EAS marker that, when active, generates a response signal when passed through this interrogation zone. An antenna and receiver in the same or another "pedestal" detects this response signal and generates an alarm.

AM systems are a commonly used for EAS tag detection and are well known in the art. The detectors in an AM system emit periodic bursts at 58 kHz, which causes a detectable resonant response in an AM tag. A security tag in a 58 kHz system can also be implemented as an electric circuit resonant at 58 kHz.

SUMMARY

The following presents a simplified summary of one or more aspects in order to provide a basic understanding of such aspects. This summary is not an extensive overview of all contemplated aspects and is intended to neither identify key or critical elements of all aspects nor delineate the scope of any or all aspects. Its sole purpose is to present some concepts of one or more aspects in a simplified form as a prelude to the more detailed description that is presented later.

Example implementations include methods, apparatuses, and computer-readable medium for electronic article surveillance (EAS). Some examples include transmitting an acousto-magnetic (AM) interrogation signal into an AM interrogation zone of an EAS system. The AM interrogation zone and a wireless communication zone overlapping to form a zone of interest. The wireless communication zone employing a wireless communication technology other than AM. Such examples include indicating, by the EAS system, a presence of a first tag of the EAS system in the zone of interest upon a concurrent detection of both i) a response signal of the first tag via the wireless communication technology and ii) an AM response signal of the first tag in response to the AM interrogation signal.

In some examples, the AM response signal includes an information element in the wireless communication technology response signal. In such examples, indicating is performed upon receipt of the wireless communication technology response signal. In some examples, the information element is a bit flag in the wireless communication technology response signal set to signify that the first tag detected the transmitted AM interrogation signal. In some examples, indicating comprises alarming.

In some examples, an EAS tag includes an acousto-magnetic (AM) interrogation signal detection subsystem, and a non-AM wireless transceiver operative to transmit a signal indicating a detection of an AM interrogation signal. In some such examples, the transmitting includes transmitting the signal only in response to the concurrent detection of both the AM interrogation signal and detection of a signal of the non-AM wireless technology.

In some examples, an EAS system includes an AM transmitter, a non-AM wireless transceiver, and at least one tag. The AM transmitter is operative to transmit an AM interrogation signal into an AM interrogation zone of an EAS system. The non-AM wireless transceiver is operative to wirelessly transmit a non-AM signal into a non-AM interrogation zone of the EAS system, and is operative to receive a non-AM wireless response from a tag of the EAS system in the non-AM interrogation zone. In such examples, the AM interrogation zone and the non-AM interrogation zone overlap to form a zone of interest. In such examples, the tag includes an AM interrogation signal detection subsystem operative to detect the AM interrogation signal, and an non-AM subsystem operative to detect the non-AM wireless signal. In such examples, the tag is operative to wirelessly signal, in a non-AM response from the non-AM wireless transceiver, a concurrent detection of both the AM interrogation signal by the AM interrogation signal detection subsystem and the non-AM signal by the non-AM wireless transceiver when the tag is present in the zone of interest. In some such examples the signal of the concurrent detection comprises an AM interrogation signal detection information element in the non-AM response. In some such examples, the information element is a bit flag in the non-AM response set to indicate that the first tag detected the transmitted AM interrogation signal. In some such examples, the EAS system is further operative to alarm upon the non-AM transceiver receiving the non-AM response including the signal of concurrent detection, by the first tag, of both the AM interrogation signal and the non-AM signal. In some examples, the indicating comprises alarming.

Some examples, include a non-transitory computer-readable medium of EAS. The medium is executable by a processor to transmit concurrently, an acousto-magnetic (AM) interrogation signal into an AM interrogation zone of an EAS system, and a wireless non-AM signal into a non-AM zone of the EAS system. The AM interrogation zone and the non-AM zone overlapping to form a zone of interest. The medium is executable by a processor to indicate, by the EAS system, a presence of a first tag of the EAS system in the zone of interest upon a concurrent detection of both wireless non-AM response signal of the first tag in response to the non-AM signal and an AM response signal of the first tag in response to the AM interrogation signal. In some such examples, the AM response signal includes an information element in the non-AM response signal. In such examples, indication is performed upon receipt of the non-AM response signal. In some such examples, the information element is a bit flag in the non-AM response signal set to signify that the first tag detected the transmitted AM interrogation signal. IN some examples, indication includes alarming.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents

DETAILED DESCRIPTION

Figure 1:
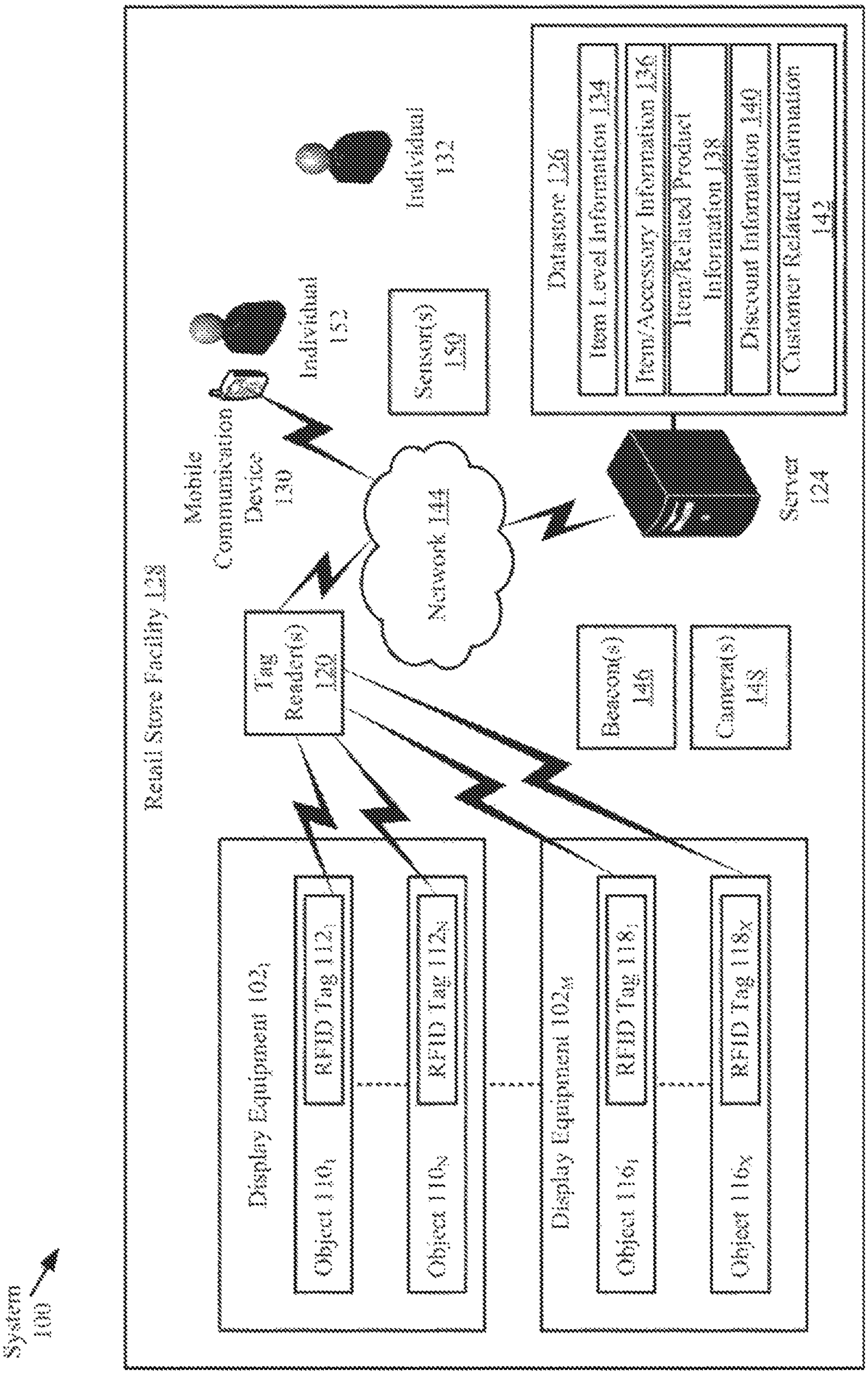
FIG. 1 is an illustration of an illustrative architecture for a system.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present solution may be embodied in other specific forms without departing from its spirit or essential characteristics. The described embodiments are to be considered in all respects only as illustrative and not restrictive. The scope of the present solution is, therefore, indicated by the appended claims rather than by this detailed description. All changes that come within the meaning and range of equivalency of the claims are to be embraced within their scope.

Reference throughout this specification to features, advantages, or similar language does not imply that all of the features and advantages that may be realized with the present solution should be or are in any single embodiment of the present solution. Rather, language referring to the features and advantages is understood to mean that a specific feature, advantage, or characteristic described in connection with an embodiment is included in at least one embodiment of the present solution. Thus, discussions of the features and advantages, and similar language, throughout the specification may, but do not necessarily, refer to the same embodiment.

Furthermore, the described features, advantages and characteristics of the present solution may be combined in any suitable manner in one or more embodiments. One skilled in the relevant art will recognize, in light of the description herein, that the present solution can be practiced without one or more of the specific features or advantages of a particular embodiment. In other instances, additional features and advantages may be recognized in certain embodiments that may not be present in all embodiments of the present solution.

Reference throughout this specification to "one embodiment," "an embodiment," or similar language means that a particular feature, structure, or characteristic described in connection with the indicated embodiment is included in at least one embodiment of the present solution. Thus, the phrases "in one embodiment", "in an embodiment," and similar language throughout this specification may, but do not necessarily, all refer to the same embodiment.

As used in this document, the singular form "a," "an," and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to."

In the retail industry, it is common to "source tag" merchandise with RFID tags, either at the time of packaging/manufacture, or at some other point in the in the supply chain. At the same time, electronic article surveillance (EAS) technology and devices have proven critical to the reduction of theft and so called "shrinkage." Since many items arrive at the retailer with RFID tags, it is desirable that RFID tag be used to also provide EAS functionality in addition to their intended function of providing capabilities such as inventory control, shelf reading, non-line of sight reading, etc.

It is known to achieve combined EAS and RFID functions by physically packaging separate RFID and EAS tags together in a single housing. In this arrangement, the RFID and EAS functions are usually implemented as separate, discrete components that are co-located within one enclosure. In this arrangement, there are drawbacks relating to cost, size and performance degradation and interference caused by placing the full EAS and RFID components in close proximity.

In some implementations, an RFID tag can be used to simulate EAS functionality by sending special codes when a reader interrogates the RFID tag. This arrangement advantageously eliminates the need for a separate EAS component within the tag, or a separate EAS tag.

Currently, using RFID as an EAS exit solution limits the ability for the retailer to place merchandise too close to the exit system due to false alarms. The large read ranges of the RFID technology coupled with RF reflections makes it very difficult to control the RFID system's detection area at the exit. AM technology is immune to RF reflections and allows for a much more predictable and reduced detection area. Once the RFID read is ANDED with the AM signal detection an alarm should only be triggered when the tag/label is within very close proximity of the exit system.

These and other features of the present disclosure are discussed in detail below with regard to FIGS. 1-7.

Referring now to FIG. 1, there is provided a schematic illustration of an illustrative system 100 that is useful for understanding the present solution. The present solution is described herein in relation to a retail store environment. The present solution is not limited in this regard, and can be used in other environments. For example, the present solution can be used in distribution centers, factories and other commercial environments. Notably, the present solution can be employed in any environment in which objects and/or items need to be located and/or tracked.

The system 100 is generally configured to allow (a) improved inventory counts and surveillance of objects and/or items located within a facility, and (b) improved customer experiences. As shown in FIG. 1, system 100 comprises a Retail Store Facility ("RSF") 128 in which display equipment $\mathbf{102}_1, \ldots, \mathbf{102}_M$ is disposed. The display equipment is provided for displaying objects (or items) $\mathbf{110}_1$-$\mathbf{110}_N$, $\mathbf{116}_1$-$\mathbf{116}_X$ to customers of the retail store. The display equipment can include, but is not limited to, shelves, article display cabinets, promotional displays, fixtures and/or equipment se-curing areas of the RSF 128. The RSF can also include emergency equipment (not shown), checkout counters, and an EAS system (not shown). Emergency equipment, checkout counters, video cameras, people counters, and EAS systems are well known in the art, and therefore will not be described herein.

At least one tag reader 120 is provided to assist in counting and tracking locations the objects $\mathbf{110}_1$-$\mathbf{110}_N$, $\mathbf{116}_1$-$\mathbf{116}_X$ within the RSF 128. The tag reader 120 comprises an RFID reader configured to read RFID tags. RFID readers are well known in the art, and therefore will be described at a sufficient level of detail below for understanding of the claimed invention. Any known or to be known RFID reader can be used herein without limitation as a basis for the technology disclosed herein.

RFID tags $\mathbf{112}_1$-$\mathbf{112}_N$, $\mathbf{118}_1$-$\mathbf{118}_X$ are respectively attached or coupled to the objects $\mathbf{110}_1$-$\mathbf{110}_N$, $\mathbf{116}_1$-$\mathbf{116}_X$. This coupling is achieved via an adhesive (e.g., glue, tape, or sticker), a mechanical coupler (e.g., straps, clamps, snaps, etc.), a weld, chemical bond, or other means. The RFID tags can alternatively or additionally comprise dual-technology tags that have both EAS and RFID capabilities.

Notably, the tag reader 120 is strategically placed at a known location within the RSF 128, for example, at an exit/entrance. By correlating the tag reader's RFID tag reads and the tag reader's known location within the RSF 128, it is possible to determine the location of objects $\mathbf{110}_1, \ldots, \mathbf{110}_N$, $\mathbf{116}_1, \ldots, \mathbf{116}_X$ within the RSF 128. The tag reader's known coverage area also facilitates object location determinations. Accordingly, RFID tag read information and tag reader location information is stored in a datastore 126. This information can be stored in the datastore 126 using a server 124 and network 144 (e.g., an Intranet and/or Internet).

System 100 also comprises a Mobile Communication Device ("MCD") 130. MCD 130 includes, but is not limited to, a cell phone, a smart phone, a table computer, a personal digital assistant, and/or a wearable device (e.g., a smart watch). Each of the listed devices is well known in the art, and therefore will not be described herein. In accordance with some examples, the MCD 130 has a software application installed thereon that is operative to: facilitate the provision of various information 134-142 to the individual 152; facilitate a purchase transaction; and/or facilitate the detachment of the RFID tags $\mathbf{112}_1$-$\mathbf{112}_N$, $\mathbf{118}_1$-$\mathbf{118}_X$ from the objects $\mathbf{110}_1, \ldots, \mathbf{110}_N$, $\mathbf{116}_1, \ldots, \mathbf{116}_X$; and/or facilitate the detachment of an anchored chain or cable from the objects $\mathbf{110}_1, \ldots, \mathbf{110}_N$, $\mathbf{116}_1, \ldots, \mathbf{116}_X$.

The MCD 130 is generally configured to provide a visual and/or auditory output of item level information 134, accessory information 136, related product information 138, discount information 140 and/or customer related information 142. The item level information includes, but is not limited to, an item description, item nutritional information, a promotional message, an item regular price, an item sale price, a currency symbol, and/or a source of the item.

An accessory includes, but is not limited to, a useful auxiliary item that can be attached to or removed from an item (e.g., a drill bit or battery of a drill). The accessory information includes, but is not limited to, an accessory description, accessory nutritional information, a promotional message, an accessory regular price, an accessory sale price, a currency symbol, a source of the accessory, and/or an accessory location in the facility.

A related product includes, but is not limited to, a product that can be used in conjunction with or as an alternative to another product (e.g., diaper rash cream which can be used when changing a diaper, or a first diaper can be used as an alternative to another diaper). The related product information includes, but is not limited to, a related product description, related product nutritional information, a promotional message, a related product regular price, a related product sale price, a currency symbol, a source of the related product, and/or a related product location in the facility.

The discount information can include, but is not limited to, a discount price for a product based on a loyalty level or other criteria. The customer related information includes, but is not limited to, customer account numbers, customer identifiers, usernames, passwords, payment information, loyalty levels, historical purchase information, and/or activity trends.

The item level information, accessory information, related product information and/or discount in-formation can be output in a format selected from a plurality of formats based on a geographic location of the item, a location of the MCD, a date, and/or an item pricing status (i.e., whether the item is on sale). In a display context, the format is defined by a font parameter, a color parameter, a brightness parameter, and/or a display blinking parameter. In an auditory context, the format is defined by a volume parameter, a voice tone parameter, and/or a male/female voice selected parameter.

The MCD 130 can also be configured to read barcodes and/or RFID tags. Information obtained from the barcode and/or RFID tag reads may be communicated from the MCD 130 to the server 124 via network 144. Similarly, the stored information 134-142 is provided from the server 124 to the MCD 130 via network 144. The network 144 includes an Intranet and/or the Internet.

Server 124 can be local to the facility 128 as shown in FIG. 1 or remote from the facility 128. Server 124 will be described in more detail below in relation to FIG. 4. Still, it should be understood that server 124 is configured to: write data to and read data from datastore 126, RFID tags $\mathbf{112}_1$-$\mathbf{112}_N$, $\mathbf{118}_1$-$\mathbf{118}_X$, and/or MCD 130; perform language and currency conversion operations using item level information and/or accessory information obtained from the datastore, RFID tags, and/or MCD; perform data analytics based on inventory information, tag read information, MCD tacking information, and/or information 134-142; perform image processing using images captured by camera(s) 148; and/or determine locations of RFID tags and/or MCDs in the RSF 128 using beacon(s) 146, tag reader 120 or other devices having known locations and/or antenna patterns.

The server 124 facilitates updates to the information 134-142 output from the MCD 130. Such information updating can be performed periodically, in response to instructions received from an associate (e.g., a retail store employee 132), in response to a detected change in the item level, accessory and/or related product information, in response to a detection that an individual is in proximity to an RFID tag, and/or in response to any motion or movement of the RFID tag. For example, if a certain product is placed on sale, then the sale price for that product is transmitted to MCD 130 via network 144 and/or RFID tag. The sale price is then output from the MCD 130. The present solution is not limited to the particulars of this example.

Although a single MCD 130 and/or a single server 124 is(are) shown in FIG. 1, the present solution is not limited in this regard. It is contemplated that more than one computing device can be implemented. In addition, the present solution is not limited to the illustrative system architecture described in relation to FIG. 1.

During operation of system 100, the content displayed on the display screen of the MCD 130 is dynamically controlled based upon various tag or item related information and/or customer related information (e.g., mobile device identifier, mobile device location in RSF 128, and/or customer loyalty level). Tag or item level information includes, but is not limited to, first information indicating that an RFID tag is in motion or that an object is being handled by an individual 152, second information indicating a current location of the RFID tag and/or the MCD 130, third information indicating an accessory or related product of the object to which the moving RFID tag is coupled, and/or fourth information indicating the relative locations of the accessory and the moving RFID tag and/or the relative locations of the related product and the moving RFID tag. The first, second and fourth information can be derived based on sensor data generated by sensors local to the RFID tag. Accordingly, the RFID tags 112$_1$-112$_N$, 118$_1$-118$_X$ include one or more sensors to detect their current locations, detect any individual in proximity thereto, and/or detect any motion or movement thereof. The sensors include, but are not limited to, an Inertial Measurement Unit ("IMU"), a vibration sensor, a light sensor, an accelerometer, a gyroscope, a proximity sensor, a microphone, and/or a beacon communication device. The third information can be stored local to the RFID tag(s) or in a remote datastore 126 as information 136, 138.

In some scenarios, the MCD 130 facilitates the server's 124 (*a*) detection of when the individual 152 enters the RSF 128, (b) tracking of the individual's movement through the RSF, (c) detection of when the individual is in proximity to an object to which an RFID tag is coupled, (d) determination that an RFID tag is being handled or moved by the individual based on a time stamped pattern of MCD movement and a timestamped pattern of RFID tag movement, and/or (e) determination of an association of moving RFID tags and the individual.

When a detection is made that an RFID tag is being moved, the server 124 can, in some scenarios, obtain customer related information (such as a loyalty level) 142 associated with the individual 152. This information can be obtained from the individual's MCD 130 and/or the datastore 126. The customer related information 142 is then used to retrieve discount information 140 for the object to which the RFID tag is coupled. The retrieved discount information is then communicated from the server 124 to the individual's MCD 130. The individual's MCD 130 can output the dis-count information in a visual format and/or an auditory format. Other information may also be communicated from the server 124 to the individual's MCD 130. The other information includes, but is not limited to, item level information, accessory information, and/or related product information.

In those or other scenarios, a sensor embedded in the RFID tag detects when an individual is handling the object to which the RFID tag is coupled. When such a detection is made, the RFID tag retrieves the object's unique identifier from its local memory, and wirelessly communicates the same to the tag reader 120. The tag reader 120 then passes the information to the server 124. The server 124 uses the object's unique identifier and the item/accessory relationship in-formation (e.g., table) 136 to determine if there are any accessories associated therewith. If no accessories exist for the object, the server 124 uses the item level information 134 to determine one or more characteristics of the object. For example, the object includes a product of a specific brand. The server 124 then uses the item/related product information (e.g., table) 138 to identify: other products of the same type with the same characteristics; and/or other products that are typically used in conjunction with the object. Related product information for the identified related products is then retrieved and provided to the MCD 130. The MCD 130 can output the related product information in a visual format and/or an auditory format. The individual 152 can perform user-software interactions with the MCD 130 to obtain further information obtain the related product of interest. The present solution is not limited to the particulars of this scenario.

Figure 2:
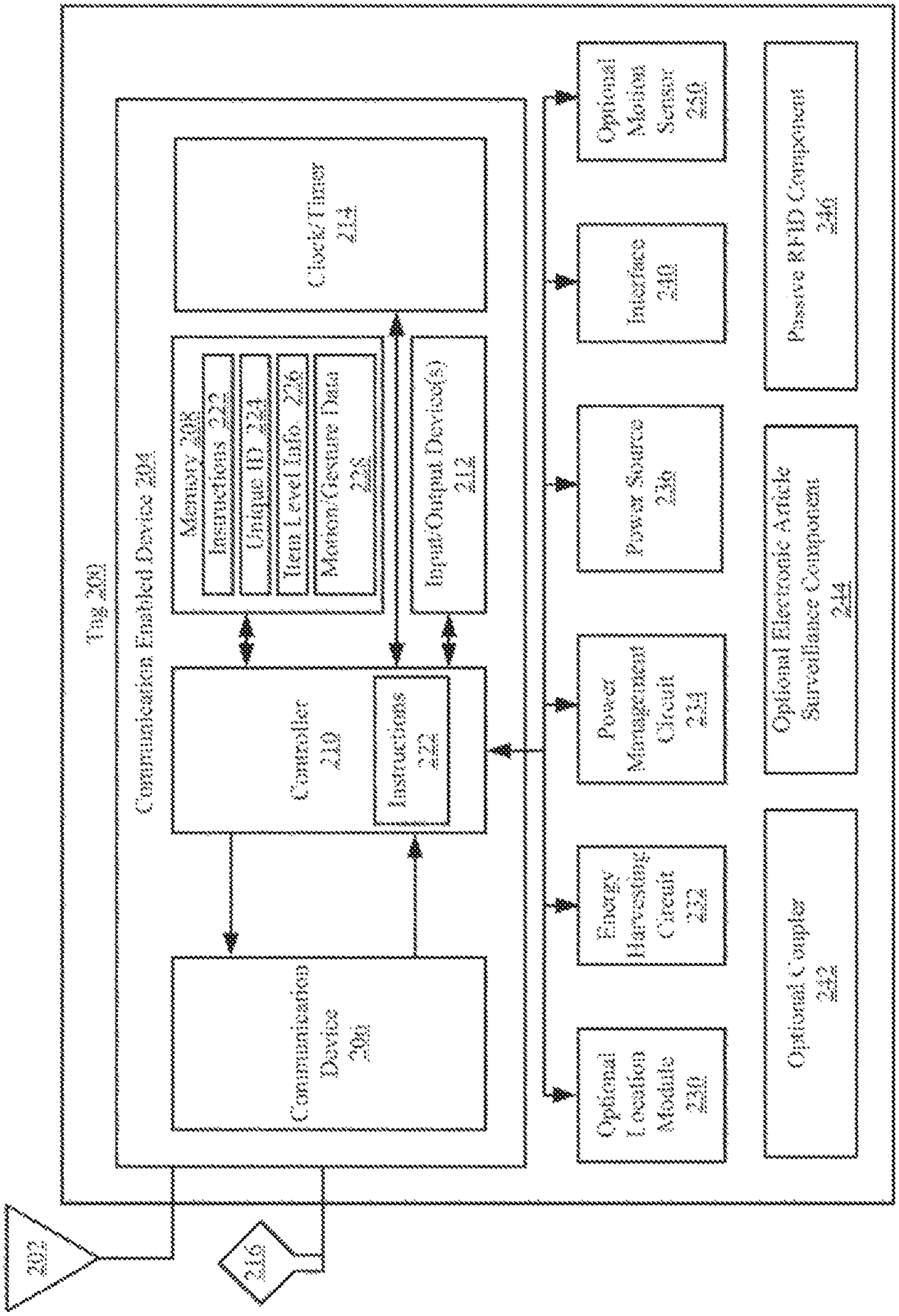
FIG. 2 is an illustration of an illustrative architecture for a tag.

Referring now to FIG. 2, there is an illustration of an illustrative architecture for a tag 200. RFID tags 112$_1$, . . . , 112$_N$, 118$_1$, . . . , 118$_X$ are the same as or similar to tag 200. As such, the discussion of tag 200 is sufficient for understanding the RFID tags 112$_1$, . . . , 112$_N$, 118$_1$, . . . , 118$_X$ of FIG. 1. Tag 200 is generally configured to perform operations to (a) minimize power usage so as to extend a power source's life (e.g., a battery or a capacitor), (b) minimize collisions with other tags so that the tag of interest can be seen at given times, (c) optimize useful information within an inventory system (e.g., communicate useful change information to a tag reader), and/or (d) optimize local feature functions.

The tag 200 can include more or less components than that shown in FIG. 2. However, the components shown are sufficient to disclose an illustrative embodiment implementing the present solution. Some or all of the components of the tag 200 can be implemented in hardware, software and/or a combination of hardware and software. The hardware includes, but is not limited to, one or more electronic circuits. The electronic circuit(s) may comprise passive components (e.g., capacitors and resistors) and active components (e.g., processors) arranged and/or programmed to implement the methods disclosed herein.

The hardware architecture of FIG. 2 represents a representative tag 200 configured to facilitate improved inventory management/surveillance and customer experience. In this regard, the tag 200 is configured for allowing data to be exchanged with an external device (e.g., tag reader 120 of FIG. 1, a beacon 146 of FIG. 1, a Mobile Communication Device ("MCD") 130 of FIG. 1, and/or server 124 of FIG. 1) via wireless communication technology. The wireless communication technology can include, but is not limited to, a Radio Frequency Identification ("RFID") technology, a Near Field Communication ("NFC") technology, and/or a Short Range Communication ("SRC") technology. For example, one or more of the following wireless communication technologies (is) are employed: Radio Frequency ("RF") communication technology; Bluetooth technology; WiFi technology; beacon technology; and/or LiFi technology. Each of the listed wireless communication technologies is well known in the art, and therefore will not be described in detail herein. Any known or to be known wireless communication technology or other wireless communication technology can be used herein without limitation.

The components 206-214 shown in FIG. 2 may be collectively referred to herein as a communication enabled device 204, and include a memory 208 and a clock/timer 214. Memory 208 may be a volatile memory and/or a non-volatile memory. For example, the memory 208 can include, but is not limited to, Random Access Memory ("RAM"), Dynamic RAM ("DRAM"), Static RAM ("SRAM"), Read Only Memory ("ROM"), and flash memory. The memory 208 may also comprise unsecure memory and/or secure memory.

In some scenarios, the communication enabled device 204 comprises a Software Defined Radio ("SDR"). SDRs are well known in the art, and therefore will not be described in detail herein. However, it should be noted that the SDR can be programmatically assigned any communication protocol that is chosen by a user (e.g., RFID, WiFi, LiFi, Bluetooth, BLE, Nest, ZWave, Zigbee, etc.). The communication protocols are part of the device's firmware and reside in memory 208. Notably, the communication protocols can be downloaded to the device at any given time. The initial/default role (being an RFID, WiFi, LiFi, etc. tag) can be assigned at the deployment thereof. If the user desires to use another protocol at a later time, the user can remotely change the communication protocol of the deployed tag 200. The update of the firmware, in case of issues, can also be performed remotely.

As shown in FIG. 2, the communication enabled device 204 comprises at least one antenna 202, 216 for allowing data to be exchanged with the external device via a wireless communication technology (e.g., an RFID technology, an NFC technology, a SRC technology, and/or a beacon technology). The antenna 202, 216 is configured to receive signals from the external de-vice and/or transmit signals generated by the communication enabled device 204. The antenna 202, 216 can comprise a near-field or far-field antenna. The antennas include, but are not limited to, a chip antenna or a loop antenna.

The communication enabled device 204 also comprises a communication device (e.g., a transceiver or transmitter) 206. Communication devices (e.g., transceivers or transmitters) are well known in the art, and therefore will not be described herein. However, it should be understood that the communication device 206 generates and transmits signals (e.g., RF carrier signals) to external devices, as well as receives signals (e.g., RF signals) transmitted from external devices. In this way, the communication enabled device 204 facilitates the registration, identification, location and/or tracking of an item (e.g., object 110 or 112 of FIG. 1) to which the tag 200 is coupled.

The communication enabled device 204 is configured so that it: communicates (transmits and receives) in accordance with a time slot communication scheme; and selectively enables/disables/bypasses the communication device (e.g., transceiver) or at least one communications operation based on output of a motion sensor 250. In some scenarios, the communication enabled device 204 selects: one or more time slots from a plurality of time slots based on the tag's unique identifier 224 (e.g., an Electronic Product Code ("EPC")); and/or determines a Window Of Time ("WOT") during which the communication device (e.g., transceiver) 206 is to be turned on or at least one communications operation is be enabled subsequent to when motion is detected by the motion sensor 250. The WOT can be determined based on environmental conditions (e.g., humidity, temperature, time of day, relative distance to a location device (e.g., beacon or location tag), etc.) and/or system conditions (e.g., amount of traffic, interference occurrences, etc.). In this regard, the tag 200 can include additional sensors not shown in FIG. 2.

The communication enabled device 204 also facilitates the automatic and dynamic modification of item level information 226 that is being or is to be output from the tag 200 in response to certain trigger events. The trigger events can include, but are not limited to, the tag's arrival at a particular facility (e.g., RSF 128 of FIG. 1), the tag's arrival in a particular country or geographic region, a date occurrence, a time occurrence, a price change, and/or the reception of user instructions.

Item level information 226 and a unique identifier ("ID") 224 for the tag 200 can be stored in memory 208 of the communication enabled device 204 and/or communicated to other external devices (e.g., tag reader 120 of FIG. 1, beacon 146 of FIG. 1, MCD 130 of FIG. 1, and/or server 124 of FIG. 1) via communication device (e.g., transceiver) 206 and/or interface 240 (e.g., an Internet Protocol or cellular network interface). For example, the communication enabled de-vice 204 can communicate information specifying a timestamp, a unique identifier for an item, item description, item price, a currency symbol and/or location information to an external device. The external device (e.g., server or MCD) can then store the information in a database (e.g., database 126 of FIG. 1) and/or use the information for various purposes.

The communication enabled device 204 also comprises a controller 210 (e.g., a CPU) and in-put/output devices 212. The controller 210 can execute instructions 222 implementing methods for facilitating inventory counts and management. In this regard, the controller 210 includes a processor (or logic circuitry that responds to instructions) and the memory 208 includes a computer-readable storage medium on which is stored one or more sets of instructions 222 (e.g., software code) configured to implement one or more of the methodologies, procedures, or functions described herein. The instructions 222 can also reside, completely or at least partially, with-in the controller 210 during execution thereof by the tag 200. The memory 208 and the controller 210 also can constitute machine-readable media. The term "machine-readable media," as used here, refers to a single medium or multiple media (e.g., a centralized or distributed database, and/or associated caches and servers) that store the one or more sets of instructions 222. The term "machine-readable media," as used here, also refers to any medium that is capable of storing, encoding, or carrying a set of instructions 222 for execution by the tag 200 and that cause the tag 200 to perform any one or more of the methodologies of the present disclosure.

The input/output devices can include, but are not limited to, a display (e.g., an E Ink display, an LCD display and/or an active matrix display), a speaker, a keypad, and/or light emitting diodes. The display is used to present item level information in a textual format and/or graphical format. Similarly, the speaker may be used to output item level information in an auditory format. The speaker and/or light emitting diodes may be used to output alerts for drawing a person's attention to the tag 200 (e.g., when motion thereof has been detected) and/or for notifying the person of a particular pricing status (e.g., on sale status) of the item to which the tag is coupled.

The clock/timer 214 is configured to determine a date, a time, and/or an expiration of a pre-defined period of time. Technique for determining these listed items are well known in the art, and therefore will not be described herein. Any known or to be known technique for determining these listed items can be used herein without limitation.

The tag 200 also comprises an optional location module 230. The location module 230 is generally configured to determine the geographic location of the tag at any given time. For example, in some scenarios, the location module 230 employs Global Positioning System ("GPS") technology and/or Internet based local time acquisition technology. The present solution is not limited to the particulars of this example. Any known or to be known technique for determining a geographic lo-cation can be used herein without limitation including relative positioning within a facility or structure.

The optional coupler 242 is provided to securely or removably couple the tag 200 to an item (e.g., object 110 or 112 of FIG. 1). The coupler 242 includes, but is not limited to, a mechanical coupling means (e.g., a strap, clip, clamp, snap) and/or adhesive (e.g., glue or sticker). The coupler 242 is optional since the coupling can be achieved via a weld and/or chemical bond.

The tag 200 can also include a power source 236, an optional Electronic Article Surveillance ("EAS") component 244, and/or a passive/active/semi-passive RFID component 246. Each of the listed components 236, 244, 246 is well known in the art, and therefore will not be described herein. Any known or to be known battery, EAS component and/or RFID component can be used herein without limitation. The power source 236 can include, but is not limited to, a rechargeable battery and/or a capacitor.

In some examples, EAS component 244 is a circuit tuned to detect the 58 kHz EAS interrogation signal used in acousto-magnetic (AM) EAS—rather than a full EAS set of metal strips. In some such embodiments, the EAS component 244 acts as a gating function for the tag 200 to transmit an RFID response in response to receiving an RFID interrogation signal, e.g., the tag 200 transmits an RFID response only upon detecting an AM interrogation signal. In some such examples, the tag 200 includes an information element, e.g., a bit flag, in the RFID response that indicates whether the EAS component 244 circuit detected an AM interrogation signal. In some such examples, a device on the RFID interrogation signal transmit side, e.g. tag reader 300 or server 400 (each discussed below), receives an RFID response that indicated that the EAS component 244 circuit detected an AM interrogation signal, and indicates the presence of the tag in a zone of interest defined by an overlap of a zone of the RFID interrogation signal and a zone of an AM interrogation signal. Such approaches can be used to employ an RFID tag as an EAS tag even in the presence of RFID response signals from tags outside the AM interrogation signal zone.

As shown in FIG. 2, the tag 200 further comprises an energy harvesting circuit 232 and a power management circuit 234 for ensuring continuous operation of the tag 200 without the need to change the rechargeable power source (e.g., a battery). In some scenarios, the energy harvesting circuit 232 is configured to harvest energy from one or more sources (e.g., heat, light, vibration, magnetic field, and/or RF energy) and to generate a relatively low amount of output power from the harvested energy. By employing multiple sources for harvesting, the device can continue to charge despite the depletion of a source of energy. Energy harvesting circuits are well known in the art, and therefore will not be described herein. Any known or to be known energy harvesting circuit can be used herein without limitation.

As noted above, the tag 200 may also include a motion sensor 250. Motion sensors are well known in the art, and therefore will not be described herein. Any known or to be known motion sensor can be used herein without limitation. For example, the motion sensor 250 includes, but is not limited to, a vibration sensor, an accelerometer, a gyroscope, a linear motion sensor, a Passive Infrared ("PIR") sensor, a tilt sensor, and/or a rotation sensor.

The motion sensor 250 is communicatively coupled to the controller 210 such that it can notify the controller 210 when tag motion is detected. The motion sensor 250 also communicates sensor data to the controller 210. The sensor data is processed by the controller 210 to determine whether or not the motion is of a type for triggering enablement of the communication device (e.g., transceiver) 206 or at least one communications operation. For example, the sensor data can be compared to stored motion/gesture data 228 to determine if a match exists there-between. More specifically, a motion/gesture pattern specified by the sensor data can be compared to a plurality of motion/gesture patterns specified by the stored motion/gesture data 228. The plurality of motion/gesture patterns can include, but are not limited to, a motion pattern for walking, a motion pattern for running, a motion pattern for vehicle transport, a motion pattern for vibration caused by equipment or machinery in proximity to the tag (e.g., an air conditioner or fan), a gesture for requesting assistance, a gesture for obtaining additional product information, and/or a gesture for product purchase. The type of movement (e.g., vibration or being carried) is then determined based on which stored motion/gesture data matches the sensor data. This feature of the present solution allows the tag 200 to selectively enable the communication device (e.g., transceiver) or at least one communications operation only when the tag's location within a facility is actually being changed (e.g., and not when a fan is causing the tag to simply vibrate).

In some scenarios, the tag 200 can be also configured to enter a sleep state in which at least the motion sensor triggering of communication operations is disabled. This is desirable, for example, in scenarios when the tag 200 is being shipped or transported from a distributor to a customer. In those or other scenarios, the tag 200 can be further configured to enter the sleep state in response to its continuous detection of motion for a given period of time. The tag can be transitioned from its sleep state in response to expiration of a defined time period, the tag's reception of a control signal from an external device, and/or the tag's detection of no motion for a period of time.

The power management circuit 234 is generally configured to control the supply of power to components of the tag 200. In the event all of the storage and harvesting resources deplete to a point where the tag 200 is about to enter a shutdown/brownout state, the power management circuit 234 can cause an alert to be sent from the tag 200 to a remote device (e.g., tag reader 120 or server 124 of FIG. 1). In response to the alert, the remote device can inform an associate (e.g., a store employee 132 of FIG. 1) so that (s)he can investigate why the tag 200 is not recharging and/or holding charge.

The power management circuit 234 is also capable of redirecting an energy source to the tag's 200 electronics based on the energy source's status. For example, if harvested energy is sufficient to run the tag's 200 function, the power management circuit 234 confirms that all of the tag's 200 storage sources are fully charged such that the tag's 200 electronic components can be run directly from the harvested energy. This ensures that the tag 200 always has stored energy in case harvesting source(s) disappear or lesser energy is harvested for reasons such as drop in RF, light or vibration power levels. If a sudden drop in any of the energy sources is detected, the power management circuit 234 can cause an alert condition to be sent from the tag 200 to the remote device (e.g., tag reader 120 or server 124 of FIG. 1). At this point, an investigation may be required as to what caused this alarm. Accordingly, the remote device can inform the associate (e.g., a store employee 132 of FIG. 1) so that (s)he can investigate the issue. It may be that other merchandise are obscuring the harvesting source or the item is being stolen.

The present solution is not limited to that shown in FIG. 2. The tag 200 can have any architecture provided that it can perform the functions and operations described herein. For example, all of the components shown in FIG. 2 can comprise a single device (e.g., an Integrated Circuit ("IC")). Alternatively, some of the components can comprise a first tag element (e.g., a Commercial Off The Shelf ("COTS") tag) while the remaining components comprise a second tag element communicatively coupled to the first tag element. The second tag element can provide auxiliary functions (e.g., motion sensing, etc.) to the first tag element. The second tag element may also control operational states of the first tag element. For example, the second tag element can selectively (a) enable and disable one or more features/operations of the first tag element (e.g., transceiver operations), (b) couple or decouple an antenna to and from the first tag element, (c) by-pass at least one communications device or operation, and/or (d) cause an operational state of the first tag element to be changed (e.g., cause transitioning the first tag element between a power save mode and non-power save mode). In some scenarios, the operational state change can be achieved by changing the binary value of at least one state bit (e.g., from 0 to 1, or vice versa) for causing certain communication control operations to be performed by the tag 200. Additionally or alternatively, a switch can be actuated for creating a closed or open circuit. The pre-sent solution is not limited in this regard.

Figure 3:
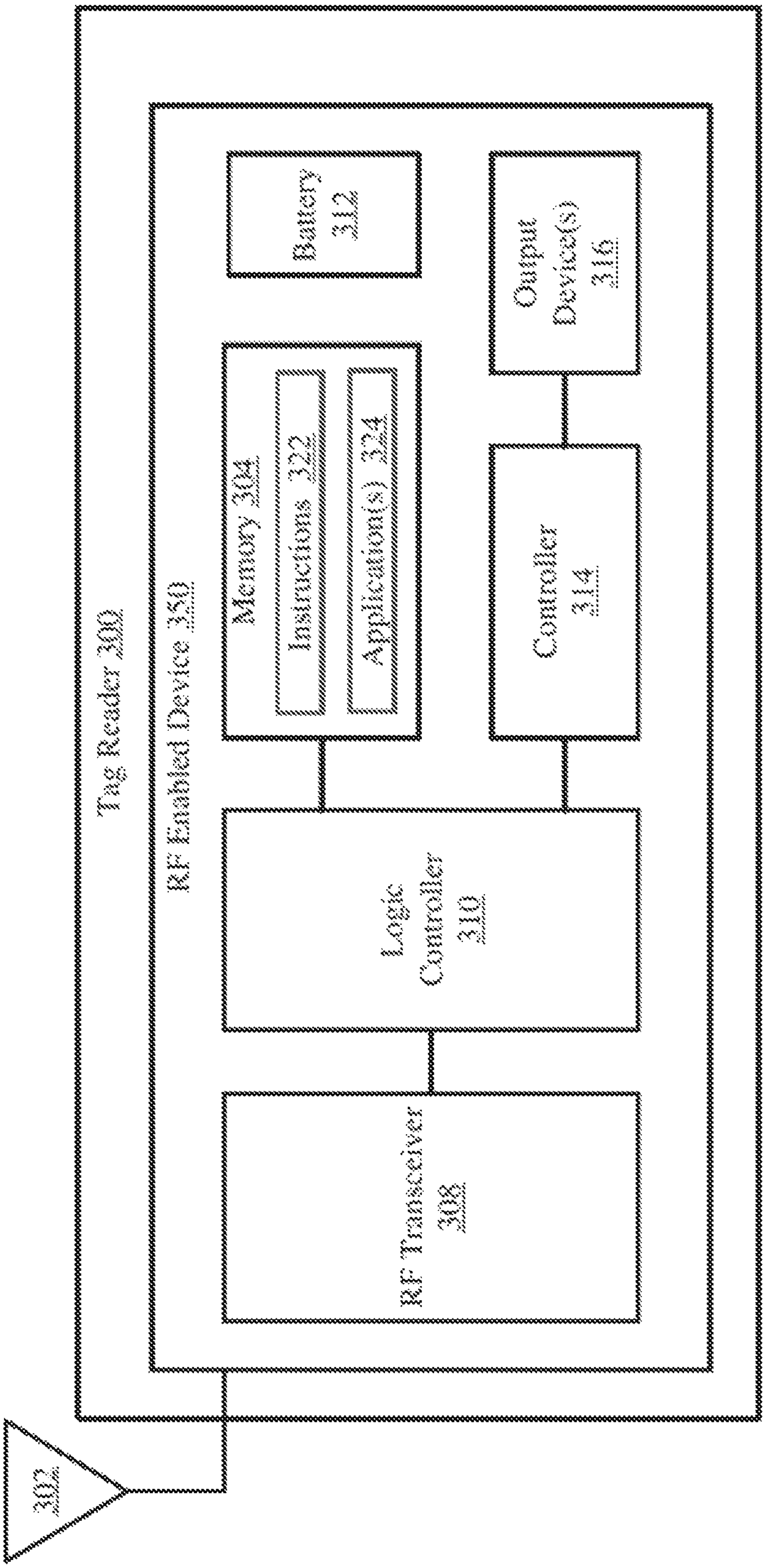
FIG. 3 is an illustration of an illustrative architecture for a tag reader.

Referring now to FIG. 3, there is provided a detailed block diagram of an exemplary architecture for a tag reader 300. Tag reader 120 of FIG. 1 is the same as or similar to tag reader 300. As such, the discussion of tag reader 300 is sufficient for understanding tag reader 120.

Tag reader 300 may include more or less components than that shown in FIG. 3. However, the components shown are sufficient to disclose an illustrative embodiment implementing the present solution. Some or all of the components of the tag reader 300 can be implemented in hardware, software and/or a combination of hardware and software. The hardware includes, but is not limited to, one or more electronic circuits. The electronic circuit may comprise passive components (e.g., capacitors and resistors) and active components (e.g., processors) arranged and/or programmed to implement the methods disclosed herein.

The hardware architecture of FIG. 3 represents an illustration of a representative tag reader 300 configured to facilitate improved inventory counts and management within an RSF (e.g., RSF 128 of FIG. 1). In this regard, the tag reader 300 comprises an RF enabled device 350 for allowing data to be exchanged with an external device (e.g., RFID tags $\mathbf{112}_1, \ldots, \mathbf{112}_N, \mathbf{118}_1, \ldots, \mathbf{118}_X$ of FIG. 1) via RF technology. The components 304-316 shown in FIG. 3 may be collectively referred to herein as the RF enabled device 350, and may include a power source 312 (e.g., a battery) or be connected to an external power source (e.g., an AC mains).

The RF enabled device 350 comprises an antenna 302 for allowing data to be exchanged with the external device via RF technology (e.g., RFID technology or other RF based technology). The external device may comprise RFID tags $\mathbf{112}_1, \ldots, \mathbf{112}_N, \mathbf{118}_1, \ldots, \mathbf{118}_X$ of FIG. 1. In this case, the antenna 302 is configured to transmit RF carrier signals (e.g., interrogation signals) to the listed external devices, and/or transmit data response signals (e.g., authentication reply signals or an RFID response signal) generated by the RF enabled device 350. In this regard, the RF enabled device 350 comprises an RF transceiver 308. RF transceivers are well known in the art, and therefore will not be described herein. However, it should be understood that the RF transceiver 308 receives RF signals including information from the transmitting device, and forwards the same to a logic controller 310 for extracting the information therefrom.

The extracted information can be used to determine the presence, location, and/or type of movement of an RFID tag within a facility (e.g., RSF 128 of FIG. 1). Accordingly, the logic controller 310 can store the extracted information in memory 304, and execute algorithms using the extracted information. For example, the logic controller 310 can correlate tag reads with beacon reads to determine the location of the RFID tags within the facility. The logic controller 310 can also perform pattern recognition operations using sensor data received from RFID tags and comparison operations between recognized patterns and pre-stored patterns. The logic controller 310 can further select a time slot from a plurality of time slots based on a tag's unique identifier (e.g., an EPC), and communicate information specifying the selected time slot to the respective RFID tag. The logic controller 310 may additionally determine a WOT during which a given RFID tag's communication device (e.g., transceiver) or operation(s) is(are) to be turned on when motion is detected thereby, and communicate the same to the given RFID tag. The WOT can be determined based on environmental conditions (e.g., temperature, time of day, etc.) and/or system conditions (e.g., amount of traffic, interference occurrences, etc.). Other operations performed by the logic controller 310 will be apparent from the following discussion.

Notably, memory 304 may be a volatile memory and/or a non-volatile memory. For example, the memory 304 can include, but is not limited to, a RAM, a DRAM, an SRAM, a ROM, and a flash memory. The memory 304 may also comprise unsecure memory and/or secure memory. The phrase "unsecure memory," as used herein, refers to memory configured to store data in a plain text form. The phrase "secure memory," as used herein, refers to memory configured to store data in an encrypted form and/or memory having or being disposed in a secure or tamper-proof enclosure.

Instructions 322 are stored in memory for execution by the RF enabled device 350 and that cause the RF enabled device 350 to perform any one or more of the methodologies of the present disclosure. The instructions 322 are generally operative to facilitate determinations as to whether or not RFID tags are present within a facility, where the RFID tags are located within a facility, which RFID tags are in motion at any given time, and which RFID tags are also in an interrogation zone of an AM interrogation signal or zone of another sensor (e.g., a camera, a Bluetooth beacon or similar near field communication system). Other functions of the RF enabled device 350 will become apparent as the discussion progresses.

Figure 4:
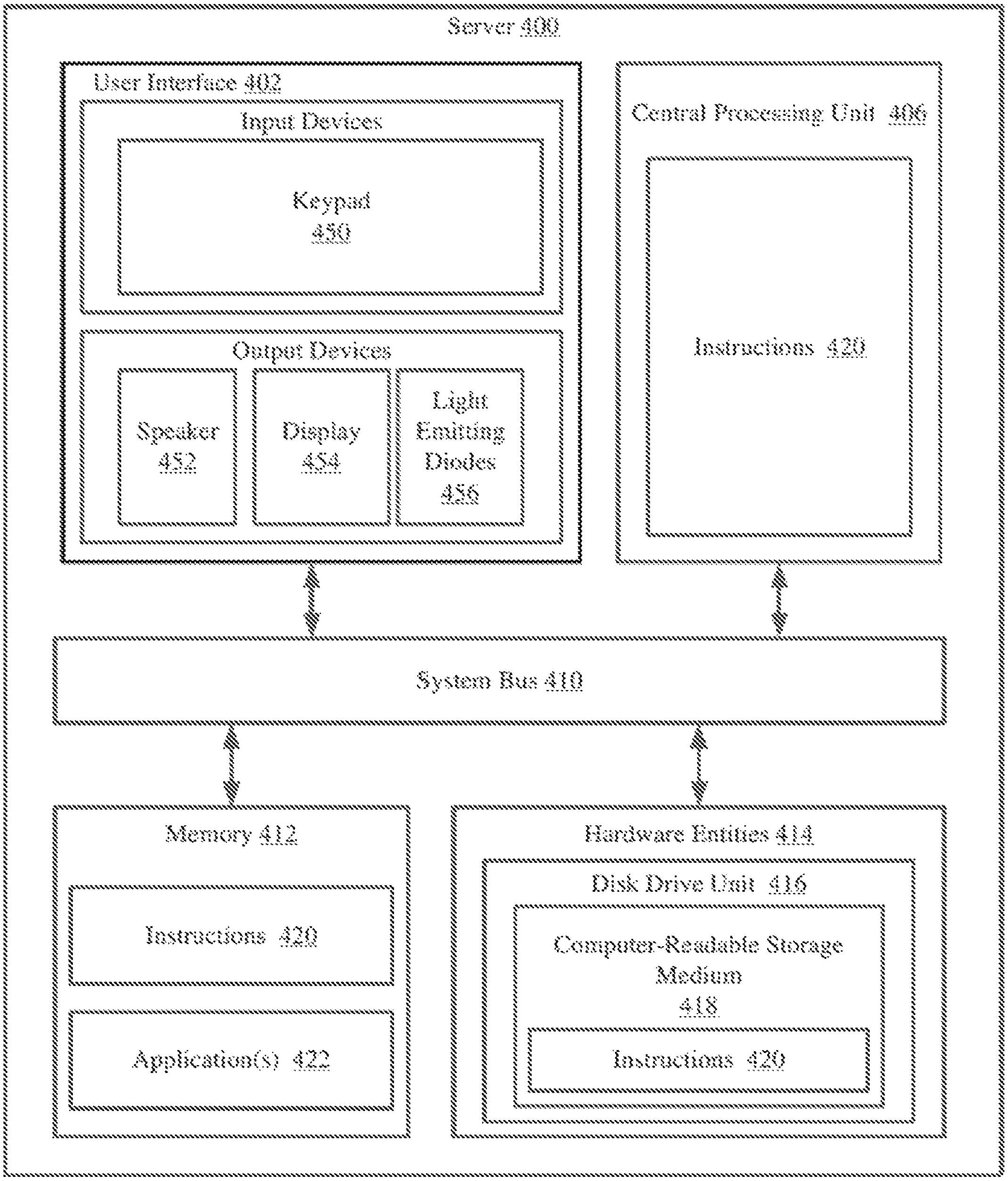
FIG. 4 is an illustration of an illustrative architecture for a server.

Referring now to FIG. 4, there is provided a detailed block diagram of an exemplary architecture for a server 400. Server 124 of FIG. 1 is the same as or substantially similar to server 400. As such, the following discussion of server 400 is sufficient for understanding server 124.

Notably, the server 400 may include more or less components than those shown in FIG. 4. However, the components shown are sufficient to disclose an illustrative embodiment implementing the present solution. The hardware architecture of FIG. 4 represents one embodiment of a representative server configured to facilitate inventory counts, inventory management, and improved customer experiences. As such, the server 400 of FIG. 4 implements at least a portion of some methods for EAS, in which an EAS system 100 concurrently transmits an AM interrogation signal into an AM interrogation zone of the EAS system 100, and a RFID interrogation signal into an RFID interrogation zone of the EAS system 100. The AM interrogation zone and the RFID interrogation zone overlapping to form a zone of interest. The EAS system 100 indicates a presence of a first tag 200 of the EAS system 100 in the zone of interest upon a concurrent detection of both an RFID response signal of the first tag in response to the RFID interrogation signal and an AM response signal of the first tag 200 in response to the AM interrogation signal. In particular, in some examples, the server 400 receives an RFID response from a tag 200 of the system wherein the RFID response indicates, e.g., through a bit flag of the response, that the tag was present in an AM interrogation zone concurrently with being in the RFID interrogation zone.

Some or all the components of the server 400 can be implemented as hardware, software and/or a combination of hardware and software. The hardware includes, but is not limited to, one or more electronic circuits. The electronic circuits can include, but are not limited to, passive components (e.g., resistors and capacitors) and/or active components (e.g., amplifiers and/or microprocessors). The passive and/or active components can be adapted to, arranged to, and/or programmed to perform one or more of the methodologies, procedures, or functions described herein.

As shown in FIG. 4, the server 400 comprises a user interface 402, a CPU 406, a system bus 410, a memory 412 connected to and accessible by other portions of server 400 through system bus 410, and hardware entities 414 connected to system bus 410. The user interface can include input devices (e.g., a keypad 450) and output devices (e.g., speaker 452, a display 454, and/or light emitting diodes 456), which facilitate user-software interactions for controlling operations of the server 400.

At least some of the hardware entities 414 perform actions involving access to and use of memory 412, which can be a RAM, a disk driver, and/or a Compact Disc Read Only Memory ("CD-ROM"). Hardware entities 414 can include a disk drive unit 416 comprising a computer-readable storage medium 418 on which is stored one or more sets of instructions 420 (e.g., software code) configured to implement one or more of the methodologies, procedures, or functions described herein. The instructions 420 can also reside, completely or at least partially, with-in the memory 412 and/or within the CPU 406 during execution thereof by the server 400. The memory 412 and the CPU 406 also can constitute machine-readable media. The term "machine-readable media," as used here, refers to a single medium or multiple media (e.g., a centralized or distributed database, and/or associated caches and servers) that store the one or more sets of instructions 420. The term "machine-readable media," as used here, also refers to any medium that is capable of storing, encoding, or carrying a set of instructions 420 for execution by the server 400 and that cause the server 400 to perform any one or more of the methodologies of the present disclosure.

In some scenarios, the hardware entities 414 include an electronic circuit (e.g., a processor) programmed for facilitating the provision of a three-dimensional map showing locations of RFID tags within a facility and/or changes to said locations in near real-time. In this regard, it should be understood that the electronic circuit can access and run a software application 422 installed on the server 400. The software application 422 is generally operative to facilitate: the determination of RFID tag locations within a facility; the direction of travel of RFID tags in motion; and the mapping of the RFID tag locations and movements in a virtual three-dimensional space.

In those or other scenarios, the hardware entities 414 include an electronic circuit (e.g., a processor) programmed for facilitating item inventorying, merchandise sale, and/or customer satisfaction with a shopping experience. In this regard, the electronic circuit can access and run an inventorying software application 422 and an MCD display software application 422 installed on the server 400. The software applications 422 are collectively generally operative to: obtain item level information and/or other information from MCDs and RFID tags; program item level information, accessory information, related product information and/or discount information onto RFID tags and/or MCDs; convert the language, pricing and/or currency symbol of item level information, accessory information, related product information and/or discount information; facilitate registration of RFID tags and MCDs with an enterprise system; and/or determine when MCD display update actions need to be taken based on RFID tag information. Other functions of the software applications 422 will become apparent as the discussion progresses. Such other functions can relate to tag reader control and/or tag control.

Figure 5:
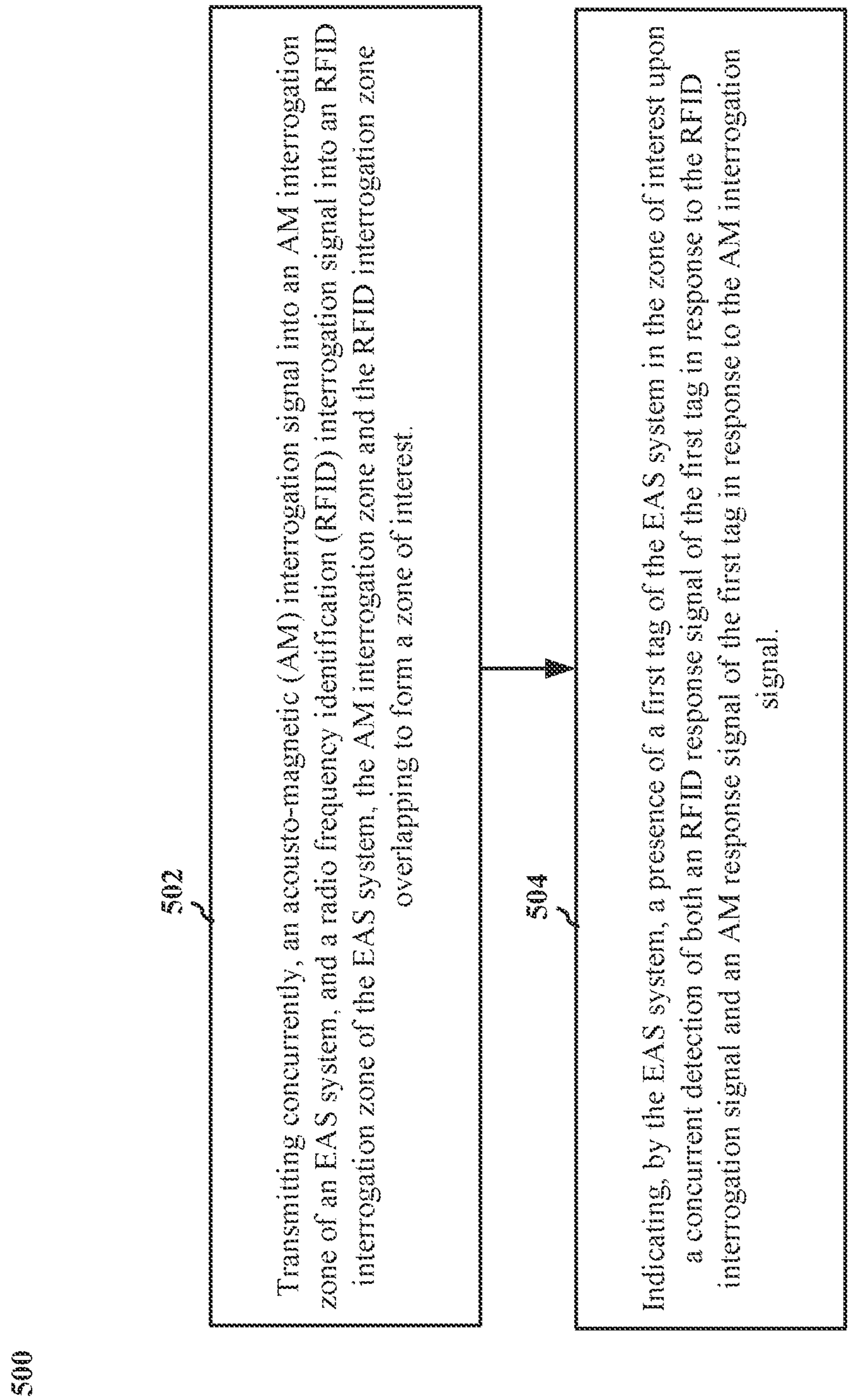
FIG. 5 is a flow chart of example methods, in accordance with examples of the technology disclosed herein.
Figure 6:
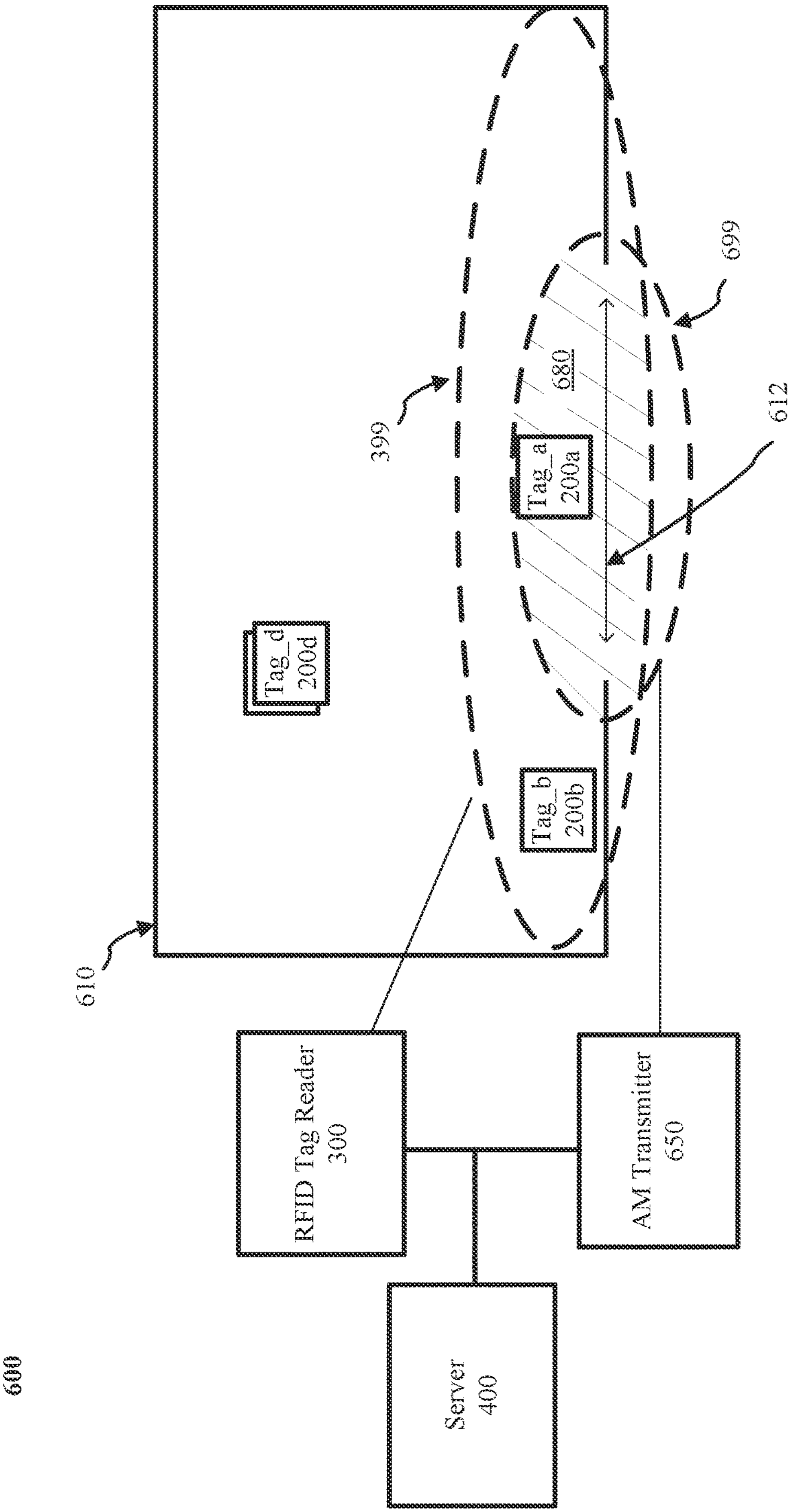
FIG. 6 is an illustration an example topology of a system, in accordance with examples of the technology disclosed herein.
Figure 7:
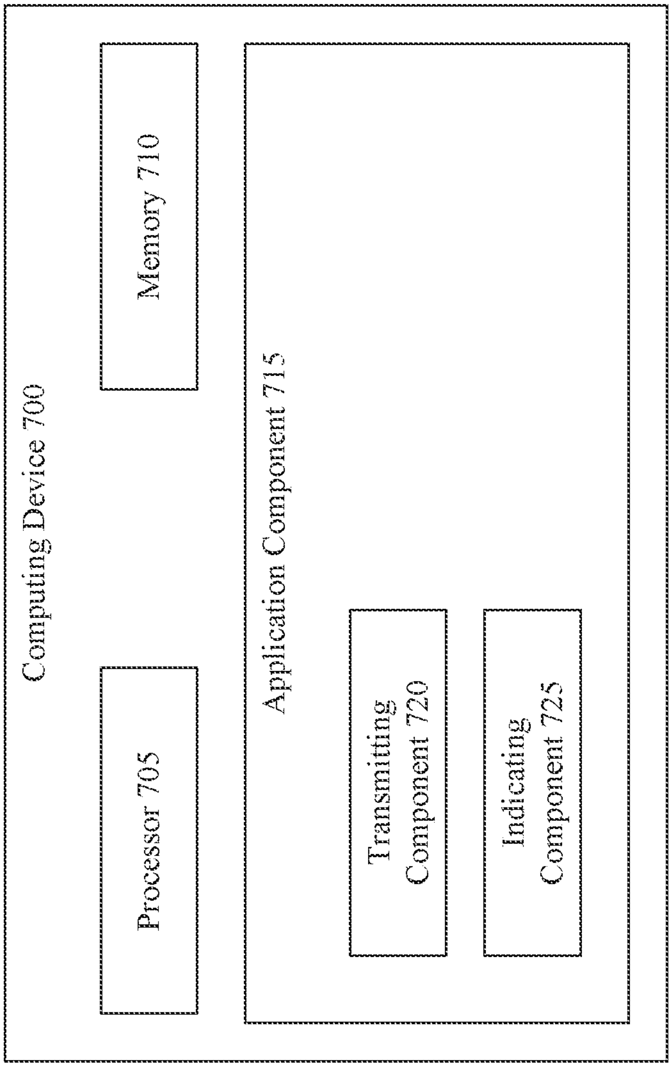
FIG. 7 is a block diagram of an example computing device, in accordance with examples of the technology disclosed herein.

Referring to FIG. 5, FIG. 6, and FIG. 7, in operation, system 100 may perform a method 500 of electronic article surveillance, by such as via execution of application component 715 by processor 705 and/or memory 710—wherein application component 715, processor 705, and/or memory 710 are components of computing device 700. Computing device 700 can be one or more of tag 200, tag reader 300, and server 400.

At block 502, the method 500 includes transmitting concurrently, an acousto-magnetic (AM) interrogation signal into an AM interrogation zone of an EAS system, and a radio frequency identification (RFID) interrogation signal into an RFID interrogation zone of the EAS system, the AM interrogation zone and the RFID interrogation zone overlapping to form a zone of interest.

For example, referring to FIG. 7, in an aspect, computer device 700, processor 705, memory 710, application component 715, and/or transmitting component 720 may be configured to or may comprise means for transmitting concurrently, an acousto-magnetic (AM) interrogation signal into an AM interrogation zone of an EAS system, and a radio frequency identification (RFID) interrogation signal into an RFID interrogation zone of the EAS system, the AM interrogation zone and the RFID interrogation zone overlapping to form a zone of interest.

For example, referring to FIG. 6, the transmitting at block 502 can include i) RFID tag reader 300 transmitting an RFID interrogation signal into RFID interrogation zone 399 in retail facility 610 covering, among other portions of retail facility 610, entry/exit 612, and ii) AM transmitter 650 transmitting a 58 kHz signal into AM interrogation zone 699 in the retail facility 610 covering, among other portions of the retail facility 610, entry exit/612. Note that the overlap between RFID interrogation zone 399 and AM interrogation zone 699 forms a zone of interest (crosshatched 680).

Further, for example, the transmitting may be performed to create such a zone of interest 680 from any two of an RFID reader 300 and an AM transmitter 650. The AM transmitter 650 may be integrated into the RFID reader 300, or the AM transmitter 650 can be a separate subsystem of system 100. Note that while tag 200*b*, in zone 399, will receive the RFID interrogation signal, tag 200*b* will not receive the AM interrogation signal since tag 200*b* is outside AM interrogation zone 699/Further, while tag 200*c*, in AM interrogation zone 699, will receive the AM interrogation signal, tag 200*c* will not receive the RFID interrogation signal.

At block 504, the method 500 includes indicating, by the EAS system, a presence of a first tag 200*a* of the EAS system 100 in the zone of interest 680 upon a concurrent detection of both an RFID response signal of the first tag 200*a* in response to the RFID interrogation signal and an AM response signal of the first tag 200*a* in response to the AM interrogation signal.

For example, referring again to FIG. 7, computer device 700, processor 705, memory 710, application component 715, and/or indicating component 725 may be configured to or may comprise means for indicating, by the EAS system, a presence of a first tag of the EAS system in the zone of interest upon a concurrent detection of both an RFID response signal of the first tag in response to the RFID interrogation signal and an AM response signal of the first tag in response to the AM interrogation signal.

For example, referring to FIG. 6, the indicating block 504 can include the RFID tag reader 300 receiving an RFID response signal from tag_a 200*a* that also includes a bit set to indicate that tag 200*a* concurrently received both the AM interrogation signal from AM transmitter 650 and the RFID interrogation signal from RFID tag reader 300. Note that tag_b 200*b*, being outside the zone of interest 680, and receiving only the RFID interrogation signal from RFID tag reader 300, will not respond with a bit set to indicate that tag_b 200*b* received the AM interrogation signal from AM transmitter 650. Also note that in this example, only an AM transmitter 650 is needed, and not an AM receiver. Similarly, in tag 200, only a circuit, or other means, to detect the AM interrogation signal is needed—no response mechanism other than setting a bit in the RFID response is needed.

In examples where the tag 200 sets a bit in the RFID response to indicate that an AM interrogation signal was received at the tag 200, tags outside the zone of interest 680 but inside the RFID interrogation zone 299 (such as tag_b 200*b*) will still respond to the RFID interrogation signal—which can be useful for inventory operations. In such examples, tag_b 200*b* can be attached to an article of merchandise on display near the portal 612 and still function as a conventional RFID tag 200 for other purposes such as inventory. In some examples, an AM interrogation signal detector acts as a gating function to the RFID tag 200 responding to the RFID interrogation signal from the RFID tag reader 300. In such an approach, the tag reader 300, the server 400, or some other component of the EAS system 100, can determine that a tag 200 is present in the zone of interest by detecting the AM interrogation response signal (e.g., a bit set in the RFID interrogation response signal).

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims.

Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of electronic article surveillance (EAS), comprising:

transmitting an acousto-magnetic (AM) interrogation signal into an AM interrogation zone of an EAS system, the AM interrogation zone and a wireless communication zone overlapping in a use of two different wireless communication technologies to form a zone of interest, the wireless communication zone employing a wireless communication technology other than AM or radio frequency identification (RFID) such that the AM interrogation signal is configured as a gate function for a first tag to transmit a response signal of the first tag via the wireless communication technology other than AM or RFID only upon detecting the AM interrogation signal; and indicating, by the EAS system, a presence of the first tag of the EAS system in the zone of interest upon a concurrent detection of both i) the response signal of the first tag via the wireless communication technology and ii) an AM response signal of the first tag in response to the AM interrogation signal.

2. The method of claim 1, wherein:

the AM response signal comprises an information element in the wireless communication technology response signal, and indicating is performed upon receipt of the wireless communication technology response signal.

3. The method of claim 2, wherein the information element is a bit flag in the wireless communication technology response signal set to signify that the first tag detected the transmitted AM interrogation signal.

4. The method of claim 1, wherein indicating comprises alarming.

5. An electronic article surveillance (EAS) system tag comprising:

an acousto-magnetic (AM) interrogation signal detection subsystem; and a non-AM wireless technology transceiver other than a radio frequency identification (RFID) transceiver, operative to transmit a signal indicating a detection of an AM interrogation signal such that the AM interrogation signal is configured as a gate function for the EAS system tag to transmit a response signal of the EAS system tag via the wireless communication technology other than AM or RFID only upon detecting the AM interrogation signal.

6. The tag of claim 5, wherein the transmitting comprises transmitting the signal only in response to concurrent detection of both the AM interrogation signal and detection of a signal of the non-AM wireless technology.

7. A electronic article surveillance (EAS) system, comprising:

an acousto-magnetic (AM) transmitter operative to transmit an AM interrogation signal into an AM interrogation zone of an EAS system;

a non-AM wireless transceiver, other than a radio frequency identification (RFID) transceiver, operative, to wirelessly transmit a non-AM signal into a non-AM interrogation zone of the EAS system, and operative to receive a non-AM wireless response from a tag of the EAS system in the non-AM interrogation zone, wherein the AM interrogation zone and the non-AM interrogation zone overlap in a use of two different wireless communication technologies to form a zone of interest;

and at least one first tag:

the at least one first tag comprising an AM interrogation signal detection subsystem operative to detect the AM interrogation signal, and a non-AM subsystem operative to detect the non-AM wireless signal such that the AM interrogation signal is configured as a gate function for the at least one tag to transmit a response signal of the at least one tag via a wireless communication technology other than AM or RFID only upon detecting the AM interrogation signal; and the at least one first tag operative to wirelessly signal, in a non-AM response from the non-AM wireless transceiver, a concurrent detection of both the AM interrogation signal by the AM interrogation signal detection subsystem and the non-AM signal by the non-AM wireless transceiver when the tag is present in the zone of interest.

8. The system of claim 7, wherein the signal of the concurrent detection comprises an AM interrogation signal detection information element in the non-AM response.

9. The system of claim 8, wherein the AM interrogation signal detection information element is a bit flag in the non-AM response that is set to indicate that the at least one first tag detected the transmitted AM interrogation signal.

10. The system of claim 7, wherein the EAS system is further operative to alarm upon the non-AM transceiver receiving the non-AM response including the signal of concurrent detection, by the at least one first tag, of both the AM interrogation signal and the non-AM signal.

11. A non-transitory computer-readable medium of an electronic article surveillance (EAS) system, storing code thereon that when executed by one or more processors of the EAS system is operable to:

transmit concurrently, an acousto-magnetic (AM) interrogation signal into an AM interrogation zone of an EAS system, and a wireless non-AM signal, other than a radio frequency identification (RFID) signal, into a non-AM zone of the EAS system, the AM interrogation zone and the non-AM zone overlapping in a use of two different wireless communication technologies to form a zone of interest such that the AM interrogation signal is configured as a gate function for a first tag to transmit a response signal of the first tag via a wireless communication technology other than AM or RFID only upon detecting the AM interrogation signal; and indicate a presence of a first tag of the EAS system in the zone of interest upon a concurrent detection of both wireless non-AM response signal of the first tag in response to the non-AM signal and an AM response signal of the first tag in response to the AM interrogation signal.

12. The non-transitory computer-readable medium of claim 11, wherein the AM response signal comprises an information element in the non-AM response signal, and wherein to indicate is performed upon receipt of the non-AM response signal.

13. The non-transitory computer-readable medium of claim 12, wherein the information element is a bit flag in the non-AM response signal set to signify that the first tag detected the transmitted AM interrogation signal.

14. The non-transitory computer-readable medium of claim 11, wherein to indicate comprises alarming.

15. The method of claim 1, wherein the wireless communication technology is selected from the group consisting of wireless fidelity (WiFi), light fidelity (LiFi), Bluetooth, Bluetooth low energy (BLE), Nest, ZWave, and Zigbee.

16. The method of claim 1, further comprising enabling the wireless communication technology for use by the method responsive to a user selection of the wireless communication technology from among a plurality of wireless communication technologies.

17. The method of claim 1, further comprising performing a gating function for the first tag to transmit a wireless communication technology response in response to receiving a wireless communication technology interrogation signal such that the first tag transmits the wireless communication technology response only upon detecting an AM interrogation signal.

18. The non-transitory computer-readable medium of claim 11, wherein the wireless communication technology is selected from the group consisting of wireless fidelity (WiFi), light fidelity (LiFi), Bluetooth, Bluetooth low energy (BLE), Nest, ZWave, and Zigbee.

19. The non-transitory computer-readable medium of claim 11, further comprising enabling the wireless communication technology for use responsive to a user selection of the wireless communication technology from among a plurality of wireless communication technologies.

20. The non-transitory computer-readable medium of claim 11, further comprising performing a gating function for the first tag to transmit a wireless communication technology response in response to receiving a wireless communication technology interrogation signal such that the first tag transmits the wireless communication technology response only upon detecting an AM interrogation signal.

* * * * *